US012811257B2

(12) United States Patent
Ohta et al.

(10) Patent No.: US 12,811,257 B2
(45) Date of Patent: Nov. 24, 2026

(54) CURRENT COLLECTOR TAB FOR SOLID-STATE BATTERIES, CURRENT COLLECTOR, AND ELECTRODE SHEET

(71) Applicant: HONDA MOTOR CO., LTD., Tokyo (JP)

(72) Inventors: Masahiro Ohta, Saitama (JP); Takuya Taniuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1491 days.

(21) Appl. No.: 17/041,432

(22) PCT Filed: Feb. 27, 2019

(86) PCT No.: PCT/JP2019/007697
§ 371 (c)(1),
(2) Date: Sep. 24, 2020

(87) PCT Pub. No.: WO2019/187941
PCT Pub. Date: Oct. 3, 2019

(65) Prior Publication Data
US 2021/0119304 A1 Apr. 22, 2021

(30) Foreign Application Priority Data
Mar. 28, 2018 (JP) ................................ 2018-061760

(51) Int. Cl.
*H01M 50/533* (2021.01)
*H01M 4/13* (2010.01)
*H01M 50/534* (2021.01)

(52) U.S. Cl.
CPC .......... *H01M 50/533* (2021.01); *H01M 4/13* (2013.01); *H01M 50/534* (2021.01)

(58) Field of Classification Search
CPC ............ H01M 50/533; H01M 50/534; H01M 50/536; H01M 4/13; H01M 50/54; Y02E 60/10
See application file for complete search history.

(56) References Cited

U.S. PATENT DOCUMENTS

2009/0080144 A1 3/2009 Matumoto et al.

FOREIGN PATENT DOCUMENTS

CN 101180693 A 5/2008
JP 2000106154 A 4/2000
(Continued)

OTHER PUBLICATIONS

English Translation JP2011-081925 (Year: 2011).*
English Translation JP2014-229435 (Year: 2014).*

*Primary Examiner* — Stephen J Yanchuk
(74) *Attorney, Agent, or Firm* — CKC & Partners Co., LLC

(57) ABSTRACT

Provided are: a current collector tab for solid-state batteries that minimizes the occurrence of cracks in an electrode active material and that makes it possible to minimize peeling within an electrode sheet or interlayer peeling in a layered body of an electrode and a solid electrolyte; a current collector; and an electrode sheet.
A stress relaxation section is provided to a current collector tab for a positive electrode sheet or a negative electrode sheet.
Specifically, the current collector tab for solid-state batteries comprises a stress relaxation section in a bent area occurring when a plurality of the current collector tabs are bundled in a solid-state battery cell.

5 Claims, 3 Drawing Sheets

(56) References Cited

FOREIGN PATENT DOCUMENTS

| | | | |
|---|---|---|---|
| JP | 2011081925 | A | 4/2011 |
| JP | 2011171107 | A | 9/2011 |
| JP | 2013178997 | A | 9/2013 |
| JP | 2014229435 | A | 12/2014 |

* cited by examiner

CURRENT COLLECTOR TAB FOR SOLID-STATE BATTERIES, CURRENT COLLECTOR, AND ELECTRODE SHEET

This application is based on and claims the benefit of priority from Japanese Patent Application No. 2018-061760, filed on 28 Mar. 2018, the content of which is incorporated herein by reference.

TECHNICAL FIELD

The present invention relates to a current collector tab, a current collector, and an electrode sheet for a solid-state battery.

BACKGROUND ART

Conventionally, lithium ion secondary batteries are widely used as secondary batteries with high energy density.

The lithium ion secondary battery has a structure in which a separator is present between a positive electrode and a negative electrode, and a liquid electrolyte (electrolytic solution) is filled.

The electrolytic solution in lithium ion secondary batteries is usually a flammable organic solvent, which can be particularly problematic in terms of safety against heat. Therefore, a solid-state battery using an inorganic solid electrolyte instead of an organic liquid electrolyte has been proposed (see Patent Document 1).

A solid-state secondary battery has a solid electrolyte layer as an electrolyte layer between a positive electrode and a negative electrode.

Solid-state batteries with solid electrolytes can eliminate the heat problem compared to batteries using electrolytic solutions, can increase the capacity and/or the voltage by stacking, and can further meet the need for compactness.

Normally, in a battery using a solid electrolyte, a plurality of configurations of a positive electrode, a solid electrolyte, and a negative electrode is stacked to form one battery cell.

Then, current collecting tabs extend from the respective positive electrodes and negative electrodes.

FIG. 1 shows a method of manufacturing a solid-state battery.

As shown in FIG. 1(*a*), a current collector tab 2, which extends from the positive electrode or the negative electrode, extends from an end of the stack of electrodes and solid electrolytes 1 of a battery cell 10.

Then, as shown in FIG. 1(*b*), the current collector tabs for the positive electrodes and the current collector tabs for the negative electrodes are sandwiched and gathered from above and below by current collector tab binding plates 3.

Subsequently, as shown in FIG. 1(*c*), the current collector tabs are welded and bound to a cell electrode 5 with a welding horn 4 to form a positive electrode terminal or a negative electrode terminal.

Here, in the dashed line region shown in FIG. 1 (*b*), when the current collector tabs converge, bending stress is generated in the stack of the electrodes and solid electrolytes 1.

As a result, a crack may occur in the electrode active material of the positive electrode or the negative electrode.

In addition, delamination within the electrode sheet of the positive or negative electrode, or delamination between layers of the stack of the electrodes and solid electrolytes may occur, resulting in positional displacement.

Patent Document 1: Japanese Unexamined Patent Application, Publication No. 2000-106154

DISCLOSURE OF THE INVENTION

Problems to be Solved by the Invention

The present invention has been made in view of the above-mentioned background art, and an object of the present invention is to provide a current collector tab, a current collector, and an electrode sheet for a solid-state battery, capable of suppressing the occurrence of cracks in an electrode active material in a solid-state battery cell, delamination within an electrode sheet, and delamination between layers of a stack of electrodes and solid electrolytes.

Means for Solving the Problems

The present inventors have noticed the fact that bending stress occurs when current collector tabs converge in a method of manufacturing a solid-state battery.

Then, the present inventors have found that the above-described problems can be solved by providing a stress relaxation section in the current collector tab of an electrode sheet of a positive electrode or a negative electrode, and thus the present invention has been completed.

That is, the present invention relates to a current collector tab for a solid-state battery. The current collector tab includes a stress relaxation section in a bending region formed when binding a plurality of the current collector tabs in a solid-state battery cell.

The stress relaxation section may have a wave shape.

The wave shape may be a triangular wave shape.

The wave shape may be a saw wave shape.

The wave shape may be a rectangular wave shape.

The wave shape may be a sinusoidal wave shape.

The thickness of the stress relaxation section of the current collector tab may be smaller than that of an other portion of the current collector tab.

The current collector tab may be a current collector tab for a positive electrode.

Another aspect of the present invention relates to a current collector for a positive electrode including the above-mentioned current collector tab for a solid-state battery.

Still another aspect of the present invention relates to an electrode sheet for a positive electrode including the above-mentioned current collector tab for a solid-state battery.

The current collector tab may be a current collector tab for a negative electrode.

Still another aspect of the present invention relates to a current collector for a negative electrode including the above-mentioned current collector tab for a solid-state battery.

Still another aspect of the present invention relates to an electrode sheet for a negative electrode including the above-mentioned current collector tab for a solid-state battery.

Effects of the Invention

For the current collector tab for a solid-state battery of the present invention, by including a stress relaxation section in the bending region formed when binding the plurality of the current collector tabs in the solid-state battery cell, it is possible to relax the bending stress generated when converging the current collector tabs.

As a result, in the solid-state battery cell, it is possible to suppress the occurrence of cracks in an electrode active material in the solid-state battery cell, delamination within and electrode sheet, and delamination between layers of a stack of electrodes and solid electrolytes. Thus, it is possible to suppress the deterioration of the input/output characteristics and to suppress the deterioration of the durability of the solid-state battery.

Furthermore, the presence of the stress relaxation section can reduce the volume at the time of binding the current collector tabs; thus, reduces the volume of the entire solid-state battery, which enables the energy density of the battery to be improved.

PREFERRED MODE FOR CARRYING OUT THE INVENTION

Embodiments of the present invention will be described below with reference to the drawings.

However, the following examples illustrate the present invention, and the present invention is not limited to the following.

<Solid-State Battery>

Typically, a solid-state battery includes a solid-state battery cell and a battery case containing the solid-state battery cell, and the solid-state battery cell is a stack comprising a positive electrode, a negative electrode, and a solid electrolyte present between the positive electrode and the negative electrode.

Figure 1:
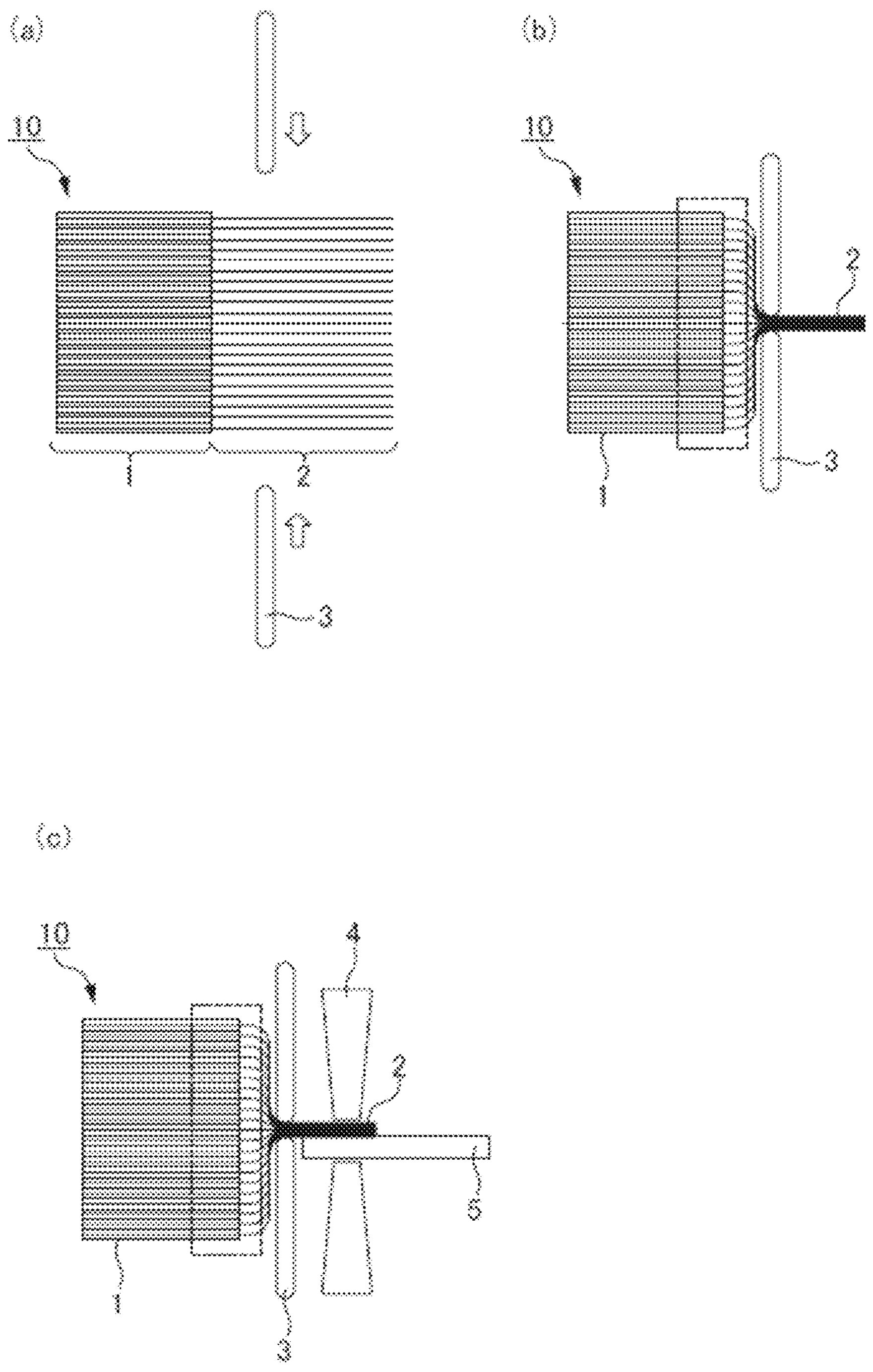
FIG. 1 is a diagram showing a method of manufacturing a solid-state battery.

FIG. 1 shows a solid-state battery cell 10 of a common solid-state battery.

As shown in FIG. 1(*a*), the solid-state battery cell 10 is a stack including a positive electrode, a negative electrode, and a solid electrolyte present between the positive electrode and the negative electrode. A current collector tab 2, which extends from the positive electrode or the negative electrode, extends from an end of the stack of electrodes and solid electrolytes 1 of the battery cell 10.

[Positive and Negative Electrodes]

The positive electrode and the negative electrode constituting the solid-state battery normally include an active material and a solid electrolyte, and optionally include a conductive auxiliary agent, a binder, and the like.

Normally, for the positive electrode and the negative electrode that constitute the solid-state battery, two types are selected from materials that can constitute electrodes.

The charge and discharge potentials of the two types of compounds are compared, the one that shows a noble potential is used for the positive electrode, and the one that shows a low potential is used for the negative electrode to constitute an arbitrary battery.

[Solid Electrolyte]

The solid electrolyte constituting the solid-state battery exists between the positive electrode and the negative electrode, and conducts ions between the positive electrode and the negative electrode.

Examples of the solid electrolyte include an oxide-based and a sulfide-based solid electrolyte.

[Current Collector Tab for Solid-State Battery]

A current collector tab for a solid-state battery is coupled to a current collecting foil of the positive or negative electrode and serves as a current collector of the solid-state battery.

The present invention relates to a current collector tab for a solid-state battery, and the current collector tab for a solid-state battery of the present invention is characterized by including a stress relaxation section in a bending region formed when binding a plurality of the current collector tabs in the solid-state battery cell.

In the present invention, by including the stress relaxation section in the bending region formed when binding the plurality of the current collector tabs, it is possible to relax the bending stress generated when converging the current collector tabs.

As a result, in the solid-state battery cell, it is possible to suppress the occurrence of cracks in an electrode active material, to suppress the delamination within an electrode sheet or the delamination between layers of the stack of the electrodes and solid-state electrolytes, and to suppress the deterioration of the input/output characteristics and to suppress the deterioration of the durability of the solid-state battery.

Furthermore, due to the presence of the stress relaxation section, it is possible to reduce the volume at the time of binding the current collector tabs; thus, the volume of the entire solid-state battery is reduced, which enables the energy density of the battery to be improved.

(For Positive and Negative Electrodes)

The current collector tab for a solid-state battery of the present invention may be either a current collector tab for a positive electrode or a current collector tab for a negative electrode.

In either case of the positive electrode or the negative electrode, the same effect can be exhibited.

(Material, Etc.)

The material, etc. for the current collector tab for a solid-state battery of the present invention are not particularly limited as long as they can be used for a solid-state battery.

In the present invention, example of the material for the current collector tab include a metal foil having a thickness of about 10 to 500 μm.

(Stress Relaxation Section)

The stress relaxation section in the current collector tab for a solid-state battery of the present invention is provided at least in the bending region formed when binding the plurality of the current collector tabs in the solid-state battery cell. The stress relaxation section may be provided at least in the bending region formed when binding the plurality of the current collector tabs in the solid-state battery cell, and may be provided on the entire current collector tab for a solid-state battery.

FIG. 1 is a diagram illustrating a method of manufacturing a solid-state battery.

In the manufacturing of the solid-state battery, as shown in FIG. 1(*b*), the current collector tabs 2, which extend from the end of the stack of the electrodes and solid electrolytes 1 of the battery cell 10 and extend from the respective positive and negative electrodes, are sandwiched and gathered from above and below by current collector tab binding plates 3 separately for the positive and negative electrodes, respectively.

At this time, in the stack of the electrodes and solid electrolytes 1 in the region indicated by the dashed line in FIG. 1 (*b*), bending stress is generated by the convergence of the current collector tabs.

Therefore, in the current collector tab for a solid-state battery of the present invention, the stress relaxation section is provided at least in the bending region formed when binding the plurality of the current collector tabs in the solid-state battery cell to relax the bending stress.

Figure 2:
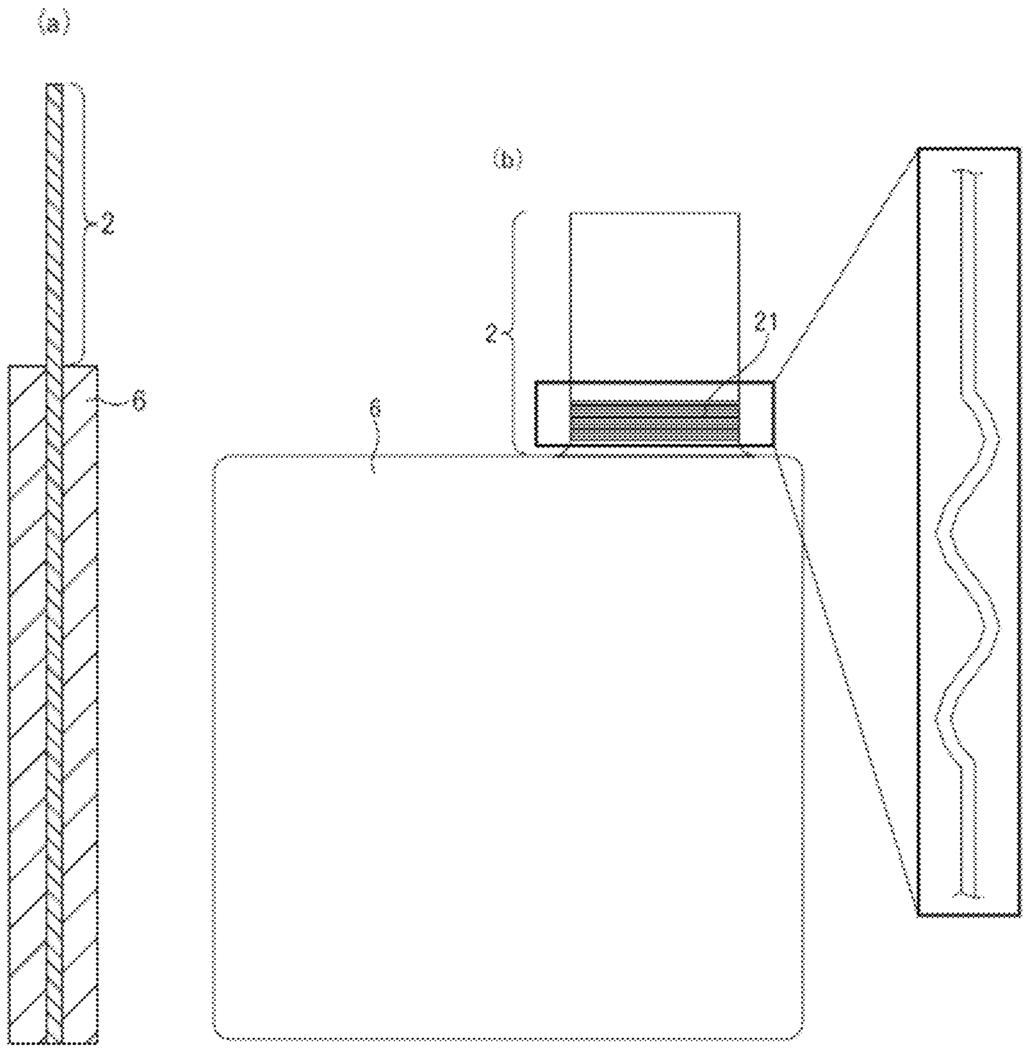
FIG. 2 is a diagram showing an electrode sheet according to an embodiment of the present invention.

FIG. 2 is a diagram showing an electrode sheet according to an embodiment of the present invention.

FIG. 2(*a*) is a cross-sectional view of the electrode sheet, and FIG. 2(*b*) is a top view of the electrode sheet.

As shown in FIG. 2(*a*), the electrode sheet has a structure in which an active material mixture 6 is laminated on a current collector with a current collector tab 2 extended.

As shown in FIG. 2(*b*), the current collector tab 2 for a solid-state battery of the present invention has a stress relaxation section 21.

{Form}

The shape of the stress relaxation section is not particularly limited as long as it is a form capable of relaxing the bending stress generated by the convergence of the current collector tabs, but in the present invention, it is preferably a wave shape.

For a wave shape, even if there is a difference in the stress applied to each electrode, since each current collector tab has the function of a spring, it is possible to relax various stresses and therefore sufficiently relax the stress.

Figure 3:
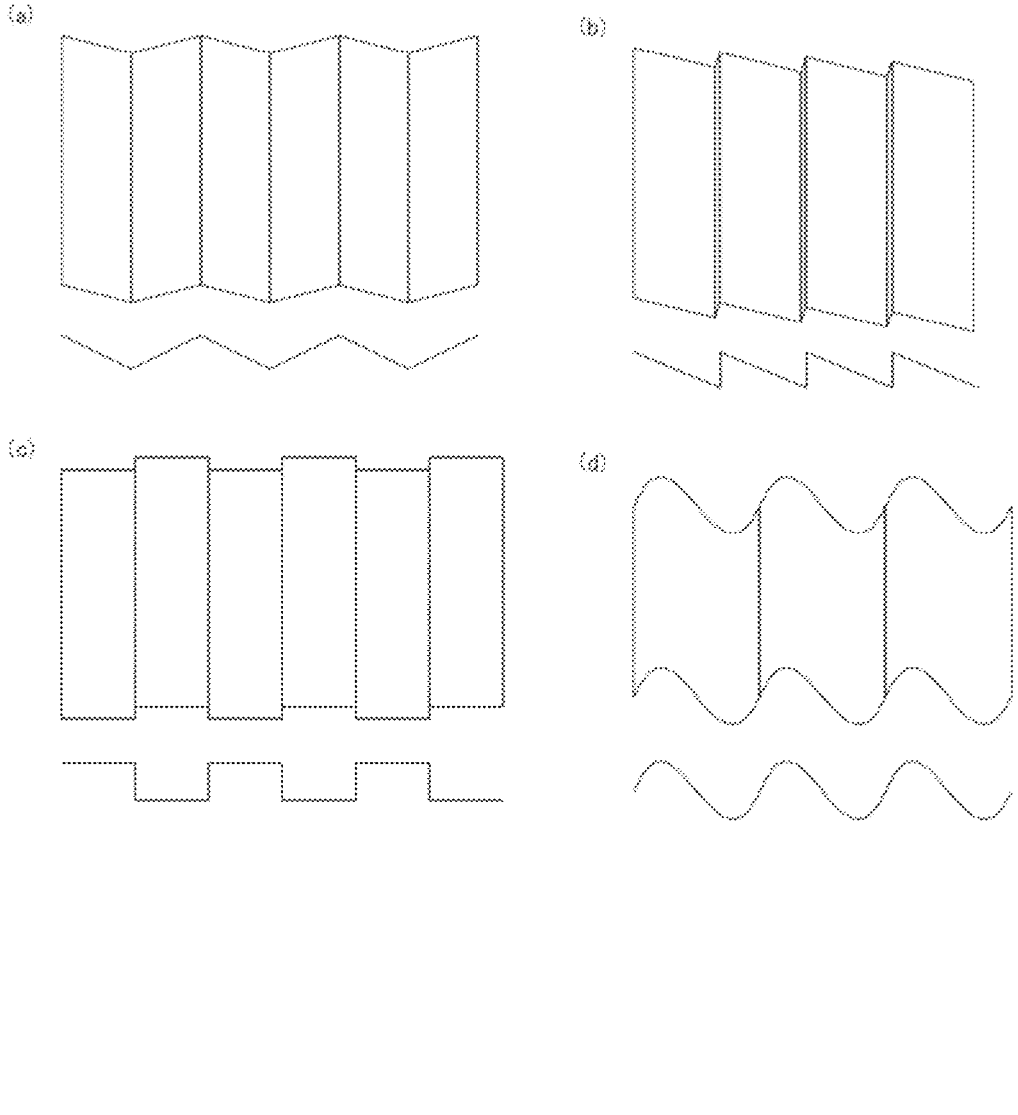
FIG. 3 is a diagram showing a stress relaxation section according to an embodiment of the present invention.

If the stress relaxation section has a wave shape, for example, preferably it has the shapes shown in FIG. 3 as embodiments.

FIG. 3(*a*) shows a triangular wave shape.

The triangular wave shape is preferable because it can be folded to save space and thus energy density is improved.

FIG. 3(*b*) shows a saw wave shape.

The saw wave shape is preferable because it can be folded to save space and thus energy density is improved.

FIG. 3(*c*) shows a rectangular wave shape.

The rectangular wave shape is preferable because it can be easily pressed and thus mass productivity is improved.

FIG. 3(*d*) shows a sinusoidal wave shape.

The sinusoidal wave shape is preferable because it can be easily pressed and thus mass productivity is improved.

(Thickness)

The thickness of the stress relaxation section of the current collector tab is preferably smaller than that of an other portion of the current collector tab.

The smaller thickness of the stress relaxation section makes it easier to bend than the other portion, thus allowing it to relax stress.

<Current Collector for Positive Electrode and Current Collector for Negative Electrode>

The current collector for a positive electrode and the current collector for a negative electrode of the present invention have the current collector tab for a solid-state battery of the present invention described above.

Other configurations are not particularly limited as long as the current collector has the current collector tab for a solid-state battery of the present invention.

Examples of the current collector include a current collector formed of a metal foil.

Examples of the metal include aluminum, stainless steel, and copper.

The current collector for a positive electrode and the current collector for a negative electrode of the present invention may have either structure in which the region other than the current collector tab and the current collector tab are formed of one sheet of foil, or structure in which the tab is connected to the outside of the region in which a composition containing a positive electrode active material is laminated.

<Electrode Sheet for Positive Electrode and Electrode Sheet for Negative Electrode>

The electrode sheet for a positive electrode of the present invention is a sheet in which a composition containing a positive electrode active material is laminated on the current collector for a positive electrode.

The electrode sheet for a negative electrode of the present invention is a sheet in which a composition containing a negative electrode active material is laminated on the current collector for a negative electrode.

The electrode sheet for a positive electrode and the electrode sheet for a negative electrode of the present invention are characterized by including the current collector tab for a solid-state battery of the present invention described above. Other configurations are not particularly limited as long as the electrode sheet includes the current collector tab for a solid-state battery of the present invention.

EXPLANATION OF REFERENCE NUMERALS

10 battery cell
1 electrode and solid electrolyte
2 current collector tab
21 stress relaxation section
3 current collector tab binding plate
4 welding horn
5 cell electrode
6 active material mixture

The invention claimed is:

1. A solid-state battery comprising a plurality of electrode sheets, the plurality of electrode sheets each comprising: a current collector comprising a current collector tab; and an active material mixture deposited on the current collector, the current collector being configured such that a current collector body on which the active material mixture is deposited, and the current collector tab, on which the active material mixture is not deposited, extending continuously and integrally from the current collector body, are formed of one sheet of foil, a stress relaxation section formed integrally with the current collector being provided in a portion of the current collector tab closer to the current collector body than a location at which a plurality of the current collector tabs are bound together in the solid-state battery, the stress relaxation section having a wave shape, and the wave shape portion having a thickness smaller than that of an other portion of the current collector tab.

2. The solid-state battery according to claim 1, wherein the wave shape is a triangular wave shape.

3. The solid-state battery according to claim 1, wherein the wave shape is a saw wave shape.

4. The solid-state battery according to claim 1, wherein the wave shape is a rectangular wave shape.

5. The solid-state battery according to claim 1, wherein the wave shape is a sinusoidal wave shape.

* * * * *